(12) United States Patent
Jevons et al.

(10) Patent No.: US 9,945,234 B2
(45) Date of Patent: Apr. 17, 2018

(54) COMPOSITE COMPONENT

(71) Applicant: ROLLS-ROYCE PLC, London (GB)

(72) Inventors: Matthew Paul Jevons, Diedorf (DE); Darren Ivor James, Ashby-de-la-Zouch (GB); Gordon Kalwak, Derby (GB)

(73) Assignee: ROLLS-ROYCE plc, London (GB)

( * ) Notice: Subject to any disclaimer, the term of this patent is extended or adjusted under 35 U.S.C. 154(b) by 291 days.

(21) Appl. No.: 14/876,330

(22) Filed: Oct. 6, 2015

(65) Prior Publication Data
US 2016/0108741 A1 Apr. 21, 2016

(30) Foreign Application Priority Data

Oct. 20, 2014 (GB) .................... 1418581.3

(51) Int. Cl.
| | |
|---|---|
| *F01D 5/14* | (2006.01) |
| *F01D 5/28* | (2006.01) |
| *F01D 5/26* | (2006.01) |
| *B32B 5/06* | (2006.01) |
| *B32B 5/32* | (2006.01) |

(52) U.S. Cl.
CPC ............... *F01D 5/282* (2013.01); *B32B 5/06* (2013.01); *B32B 5/32* (2013.01); *F01D 5/147* (2013.01); *F01D 5/26* (2013.01); *B32B 2262/101* (2013.01); *B32B 2262/103* (2013.01); *B32B 2262/106* (2013.01); *B32B 2305/08* (2013.01); *B32B 2603/00* (2013.01); *F05D 2220/32* (2013.01); *F05D 2240/30* (2013.01); *F05D 2260/941* (2013.01); *F05D 2300/603* (2013.01); *Y02T 50/672* (2013.01)

(58) Field of Classification Search
CPC .... F01D 5/282; F01D 5/147; F05D 2260/941; B23B 5/06
See application file for complete search history.

(56) References Cited

U.S. PATENT DOCUMENTS

| | | | | |
|---|---|---|---|---|
| 5,279,892 | A * | 1/1994 | Baldwin ................. | B29C 70/08 416/230 |
| 7,008,689 | B2 * | 3/2006 | Hawkins .................. | B32B 3/08 428/212 |
| 8,017,188 | B2 * | 9/2011 | Xie ......................... | B29B 11/16 427/384 |

(Continued)

FOREIGN PATENT DOCUMENTS

| | | |
|---|---|---|
| GB | 2 249 592 A | 5/1992 |
| GB | 2450139 A | 12/2008 |

OTHER PUBLICATIONS

Apr. 14, 2016 European Search Report issued in European Patent Application No. 15188472.

(Continued)

*Primary Examiner* — Ninh H Nguyen
(74) *Attorney, Agent, or Firm* — Oliff PLC

(57) ABSTRACT

A composite component having a body formed from a plurality of fiber reinforced non-metallic layers. The body includes a delamination region configured so as to permit delamination; and a deflector region configured so as to resist delamination. In the event of delamination, delamination is deflected to and continues to propagate in the delamination region.

18 Claims, 11 Drawing Sheets

(56) References Cited

U.S. PATENT DOCUMENTS

| | | | |
|---|---|---|---|
| 8,394,491 B2 * | 3/2013 | Arai | C08J 5/24 |
| | | | 428/297.4 |
| 8,647,072 B2 * | 2/2014 | McMillan | B29C 66/004 |
| | | | 415/9 |
| 2003/0017053 A1 | 1/2003 | Baldwin et al. | |
| 2003/0203179 A1 | 10/2003 | Hawkins et al. | |
| 2011/0217160 A1 | 9/2011 | McMillan | |
| 2012/0034089 A1 * | 2/2012 | Wadewitz | B29C 70/24 |
| | | | 416/223 R |

OTHER PUBLICATIONS

Sep. 1, 2015 Search Report in Great Britain Patent Application No. 1418581.3.

* cited by examiner

COMPOSITE COMPONENT

FIELD OF INVENTION

The present invention relates to a composite component, in particular but not exclusively a composite fan blade.

BACKGROUND

Gas turbine engines are typically employed to power aircraft. Typically a gas turbine engine will comprise an axial fan driven by an engine core. The engine core is generally made up of one or more turbines which drive respective compressors via coaxial shafts. The fan is usually driven directly off an additional lower pressure turbine in the engine core.

The fan comprises an array of radially extending fan blades mounted on a rotor and will usually provide, in current high bypass gas turbine engines, around seventy-five percent of the overall thrust generated by the gas turbine engine. The remaining portion of air from the fan is ingested by the engine core and is further compressed, combusted, accelerated and exhausted through a nozzle. The engine core exhaust mixes with the remaining portion of relatively high-volume, low-velocity air bypassing the engine core.

The fan blades may be manufactured from metallic or composite non-metallic materials. Generally composite non-metallic fan blades include a body formed from fibres within a resin matrix.

During operation of the gas turbine engine, the fan blades may be impacted by a foreign object (such as a bird) or if a failure occurs the fan blade may be impacted by another fan blade that has been released from the remainder of the fan. In such impact events the integrity of the fan blade should be maintained. A failure mechanism of concern for composite fan blades is delamination.

To resist delamination the fan blade may be reinforced, for example using through thickness reinforcement rods, known in the art as z-pins. U.S. Pat. No. 7,008,689 is an example of a fan blade that is reinforced using z-pins. U.S. Pat. No. 7,008,689 is concerned with providing a different number of z-pins depending on the strain energy of the blade created in a particular region during loading of the blade. In this way the strain energy of the blade is substantially uniform across the blade so as to have consistent resistance to delamination across the blade.

Although reinforcing the fan blade using z-pinning has been found to be effective for resisting delamination, reinforcement undesirably increases the cost of the fan blade.

SUMMARY OF INVENTION

A first aspect of the disclosure provides a composite component having a body formed from a plurality of fibre reinforced non-metallic layers. The body comprises a delamination region configured so as to permit delamination; and a deflector region configured so as to resist delamination. In the event of delamination, delamination is deflected to and continues to propagate in the delamination region.

Provision of a deflector region and a delamination region means that delamination is permitted in the composite component, but it is deflected to a region where delamination will minimally impede component performance (i.e. delamination is permitted in the delamination region but resisted in the deflector region). For example, when the component is a fan blade for a gas turbine engine, the deflector and delamination regions can be arranged such that after delamination has been initiated (e.g. in the event of an impact with the fan blade) the resonant frequency of the blade is away from the excitation frequencies induced during engine operation. In exemplary embodiments, the natural frequency of the blade will be substantially the same before and after delamination in the delamination region.

The average strain energy release rate of the deflector region may be at least twice that of the delamination region.

The average strain energy release rate of the deflector region may be equal to or greater than 2000 J/m$^2$. For example, the average strain energy release rate of the deflector region may be equal to or greater than 4000 J/m$^2$ and in exemplary embodiments may be equal to or greater than 5000 J/m$^2$. The average strain energy release rate of the delamination region may be equal to or less than 600 J/m$^2$.

Strain energy release rate can be measured using industrial standard tests known in the art. The above strain energy examples are measured using the ASTM standard strain release energy test, but the relative strain energy release rate of the deflector region and the delamination region can be measured using any known industrial standard, for example the ISO standard strain release energy test.

The deflector region may have a minimum width greater than 2 mm. The deflector region may have a width greater than or equal to 10 mm, or a width greater than or equal to 20 mm or a width greater than or equal to 30 mm.

In the present application width is a direction that is perpendicular to a direction extending through the thickness of a component. For example, when the component is a fan blade, the thickness direction extends from the suction surface to the pressure surface, and the width direction is perpendicular to said thickness direction.

The delamination region may be substantially free from reinforcement; for example, free from z-pins, stitching, stapling, tufting, weaving or zanchor reinforcement.

The deflector region may be reinforced using z-pins, stitching, stapling, tufting, weaving or zanchor reinforcement.

The deflector region may be reinforced using z-pins, and the deflector region may have a pin areal density equal to or between 0.5% and 5%.

The deflector region may be defined by a plurality of deflector portions.

The composite component may be a fan blade.

The fan blade and the body of the composite component may have a root, a tip, a trailing edge and a leading edge. The fan blade may include a metallic leading edge provided at the leading edge of the body and/or a metallic trailing edge provided at the trailing edge of the body.

In the present application, when the composite component is a fan blade, a spanwise direction refers to a direction extending from the root of the fan blade to the tip of the fan blade. A chordwise direction refers to a direction extending from the leading edge to the trailing edge of the fan blade.

The width of the deflector region may be at least one twentieth of the maximum width of the fan blade.

The deflector region may cover 10 to 40% of the overall area of the pressure surface of the fan blade. The deflector region may cover 10 to 40% of the overall area of the suction face of the fan blade.

The deflector region may include an elongate deflector portion extending in a spanwise direction.

The elongate deflector portion may have a chordwise width equal to or greater than 30 mm.

The elongate deflector portion may be spaced from the leading or trailing edge by a distance greater than or equal to the chordwise width of the elongate deflector portion. The elongate deflector portion may be spaced from the leading or trailing edge by a distance greater than or equal to 30 mm.

The deflector region may include three elongate deflector portions extending generally in the spanwise direction. An elongate deflector portion may be provided proximal to the leading edge, an elongate deflector portion may be provided proximal to the trailing edge, and/or an elongate deflector portion may be provided mid-way between the leading and trailing edge.

A mid-way elongate deflector portion may have a greater chordwise width than a leading and trailing edge deflector region, for example twice the width. In an exemplary embodiment, the chordwise width of the mid-way deflector region may be 60 mm.

The mid-way deflector region may be coincident with a mid-chord line of the blade.

The deflector region may include an elongate deflector portion extending in a chordwise direction. The elongate deflector portion extending in the chordwise direction may have a width in the spanwise direction equal to or between 60 and 300 mm, for example 120 mm. At least one elongate deflector portion extending in the chordwise direction may be provided proximal to a root of the blade. At least one elongate deflector portion extending in a chordwise direction may be provided proximal to the tip of the blade. The elongate deflector portion provided proximal to the tip of the blade may have a width in the spanwise direction equal to or between 30 and 180 mm, for example 60 mm. The elongate deflector portion provided proximal to the tip of the blade may be provided at a distance greater than or equal to 30 mm from the tip of the blade in a spanwise direction.

A second aspect of the disclosure provides a method of designing a composite fan blade. The method comprises providing a blade template that defines the blade geometry and dimensions. An allowable range of blade vibrations during excitations expected during use in a gas turbine engine is defined. The blade template is modified to include one or more deflector regions and one or more delamination regions. The deflector regions may have a higher strain energy than the delamination regions. The modified blade template is tested to check whether the blade operates in the defined allowable range of blade vibration. The steps of modifying the blade template and testing the modified blade template are repeated as required to optimise the blade for reduced weight and vibration performance.

The method may be used to design the composite component of the first aspect, when the composite component of the first aspect is a fan blade.

DESCRIPTION OF DRAWINGS

The invention will now be described, by way of example only, with reference to the accompanying drawings in which.

DETAILED DESCRIPTION

Figure 1:
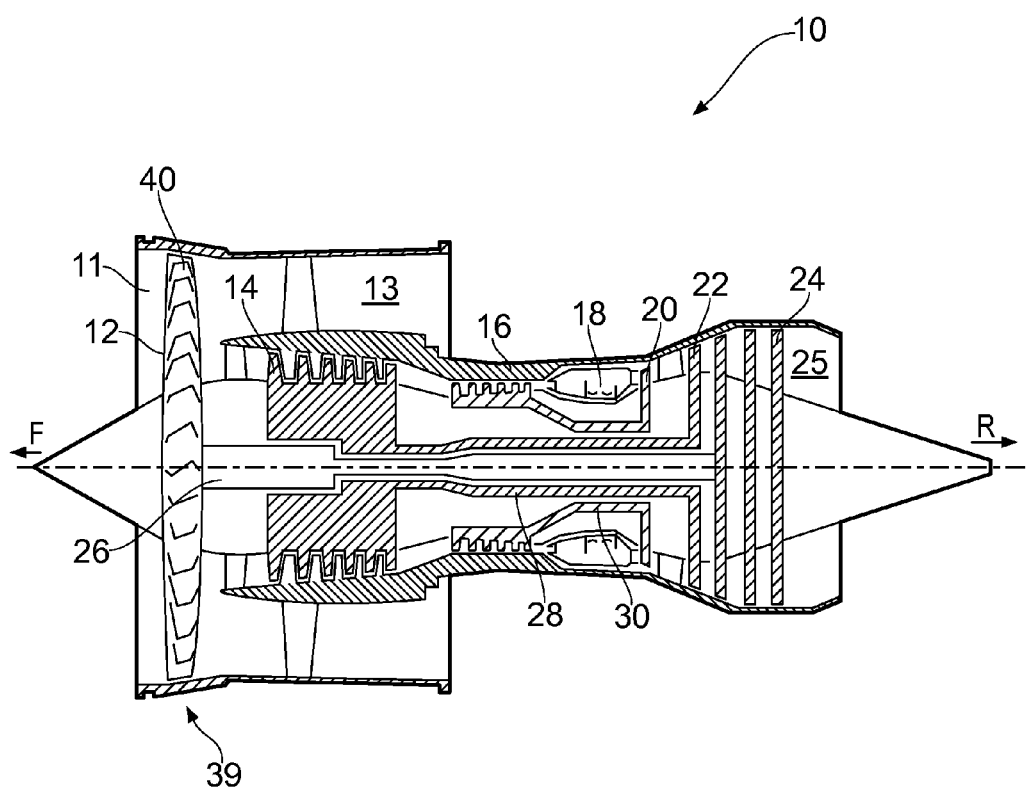
FIG. 1 illustrates a gas turbine engine.

With reference to FIG. 1 a bypass gas turbine engine is indicated at 10. The engine 10 comprises, in axial flow series, an air intake duct 11, fan 12, a bypass duct 13, an intermediate pressure compressor 14, a high pressure compressor 16, a combustor 18, a high pressure turbine 20, an intermediate pressure turbine 22, a low pressure turbine 24 and an exhaust nozzle 25. The fan 12, compressors 14, 16 and turbines 20, 22, 24 all rotate about the major axis of the gas turbine engine 10 and so define the axial direction of the gas turbine engine.

Air is drawn through the air intake duct 11 by the fan 12 where it is accelerated. A significant portion of the airflow is discharged through the bypass duct 13 generating a corresponding portion of the engine thrust. The remainder is drawn through the intermediate pressure compressor 14 into what is termed the core of the engine 10 where the air is compressed. A further stage of compression takes place in the high pressure compressor 16 before the air is mixed with fuel and burned in the combustor 18. The resulting hot working fluid is discharged through the high pressure turbine 20, the intermediate pressure turbine 22 and the low pressure turbine 24 in series where work is extracted from the working fluid. The work extracted drives the intake fan 12, the intermediate pressure compressor 14 and the high pressure compressor 16 via shafts 26, 28, 30. The working fluid, which has reduced in pressure and temperature, is then expelled through the exhaust nozzle 25 generating the remainder of the engine thrust.

The intake fan 12 comprises an array of radially extending fan blades 40 that are mounted to the shaft 26. The shaft 26 may be considered a hub at the position where the fan blades 40 are mounted.

In the present application a forward direction (indicated by arrow F in FIG. 3) and a rearward direction (indicated by arrow R in FIG. 3) are defined in terms of axial airflow through the engine 10.

Figure 2:
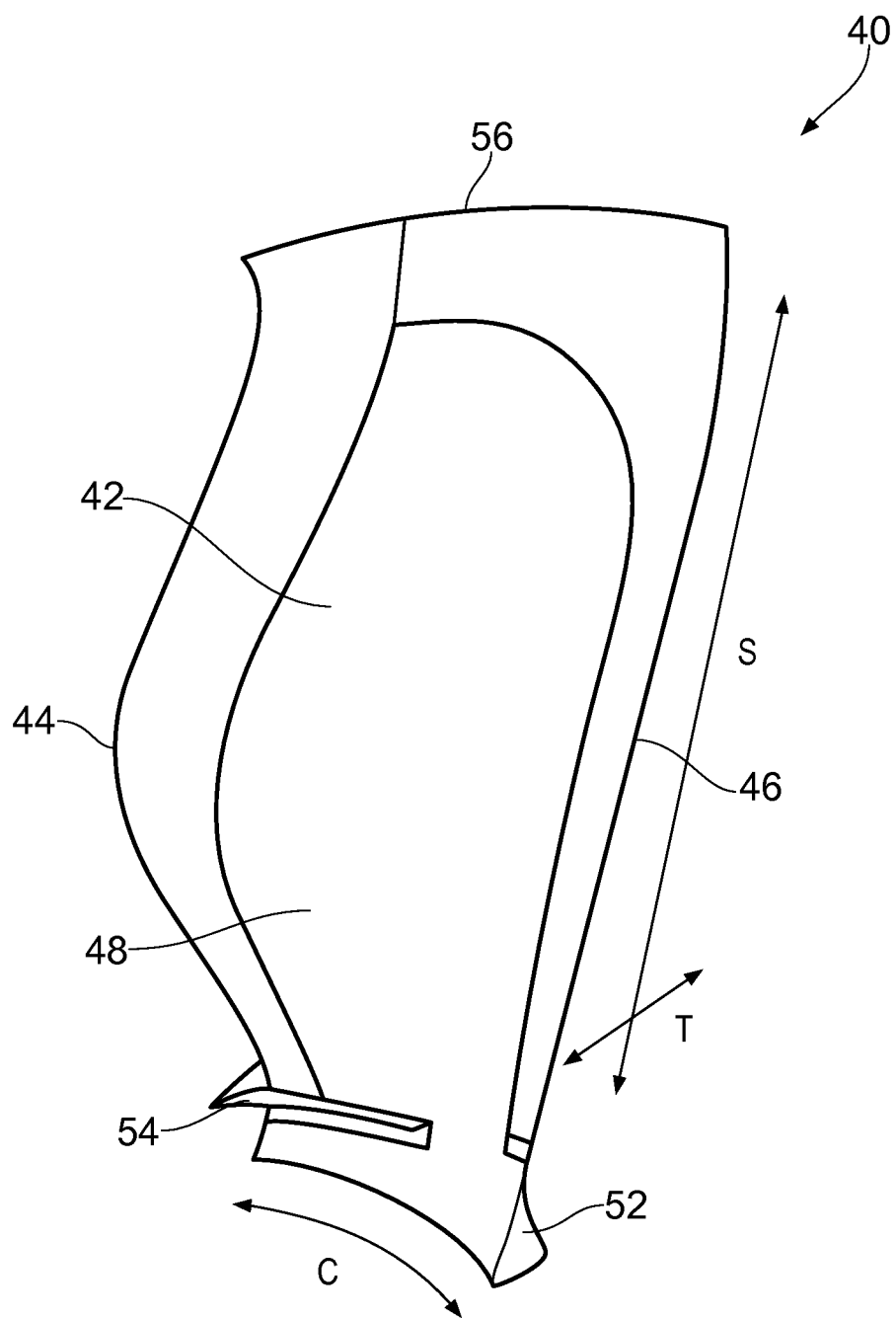
FIG. 2 illustrates a composite fan blade.

Referring to FIG. 2, the fan blades 40 each comprise an aerofoil portion 42 having a leading edge 44, a trailing edge 46, a concave pressure surface wall 48 extending from the leading edge to the trailing edge and a convex suction surface wall (not shown) extending from the leading edge to the trailing edge. The fan blade has a root 52 via which the blade can be connected to the hub. The fan blade has a tip 56 at an opposing end to the root. The fan blade may also have an integral platform 54 which may be hollow or ribbed for out of plane bending stiffness. The fan blade includes a metallic leading edge and a metallic trailing edge.

In the present application, a chordwise direction C is a direction extending between the leading edge and the trailing edge; a spanwise direction S is a direction extending between the tip of the blade and the root 52 of the blade 40; and the thickness direction T is a direction extending between the pressure surface 48 and the suction surface 50 of the blade 40.

Figure 3:
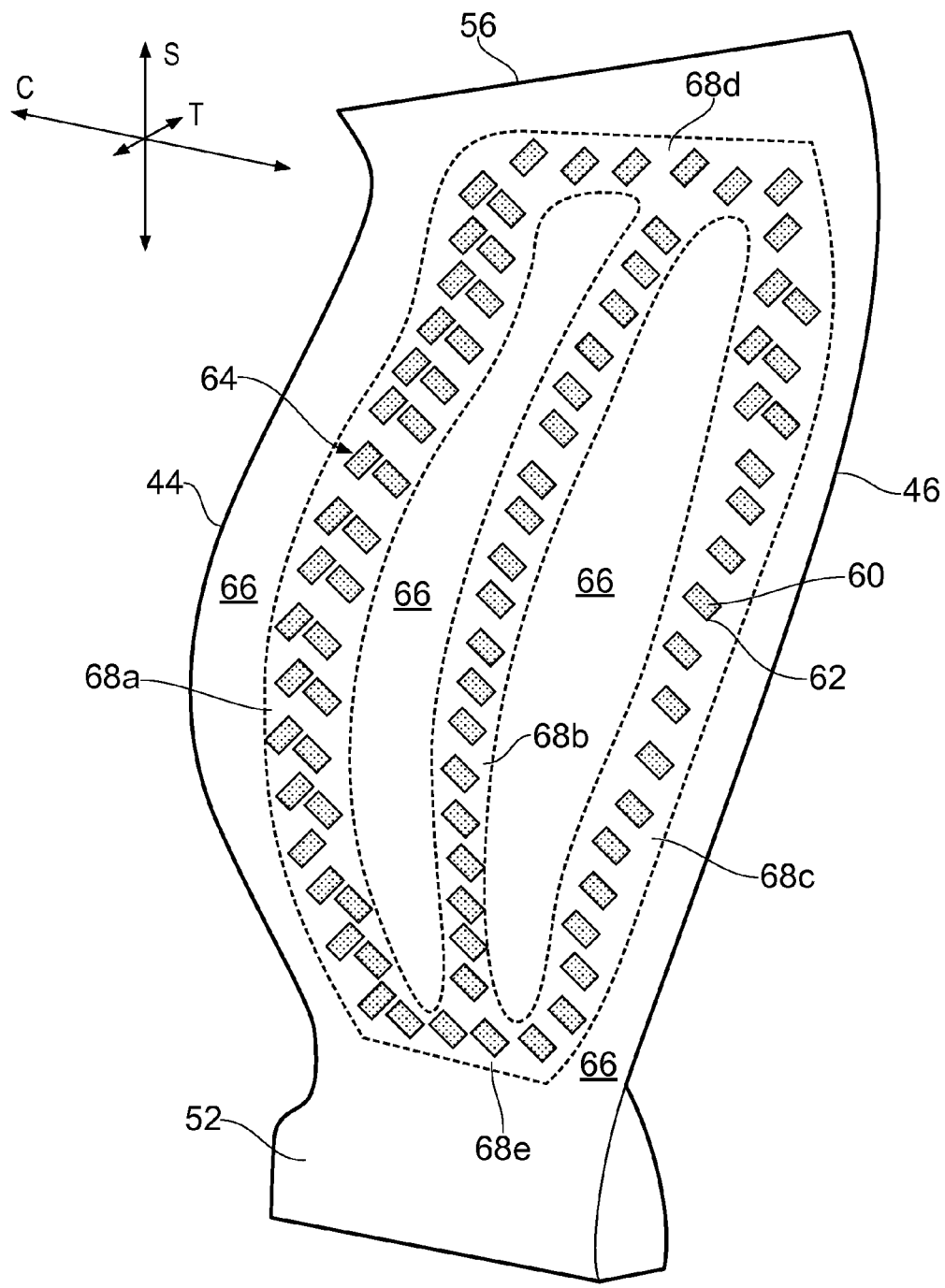
FIGS. 3 to 23 illustrate various different arrangements of delamination and deflector regions that can be used for the composite fan blade of FIG. 2.

Referring now to FIG. 3, the fan blade 40 is reinforced using pins 60 (only one pin is labelled) that extend through the thickness of the blade 40, often the pins are referred to as z-pins. Z-pins are known in the art and are pins (or rods) having a diameter of approximately 0.1 to 1 mm and can be made from various materials for example pultruded carbon fibre-epoxy composite, glass fibre composite and/or a metallic material.

Figure 4:
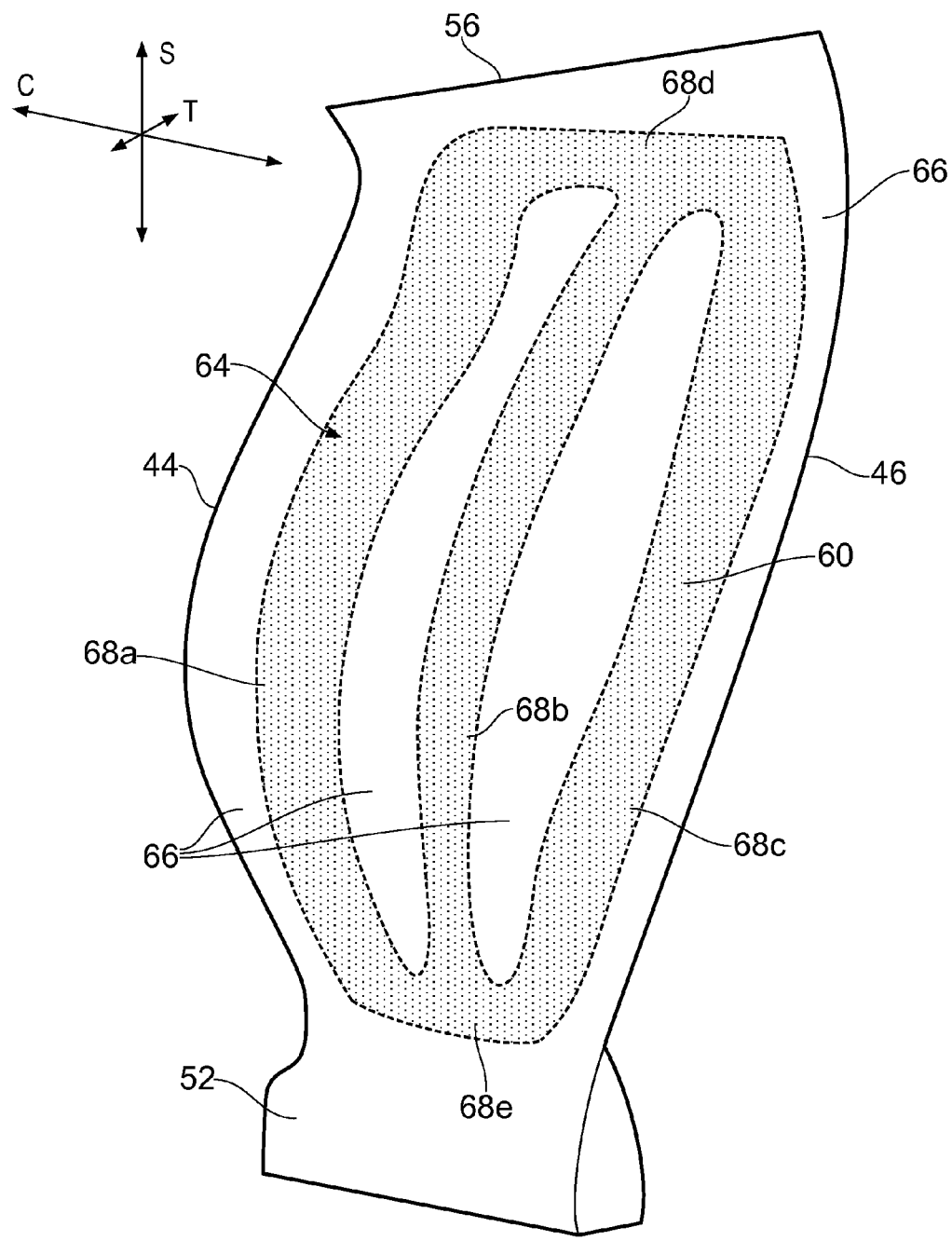
Figure 5:
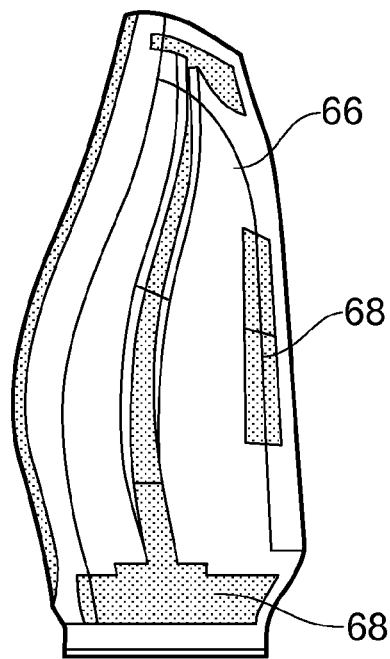
Figure 6:
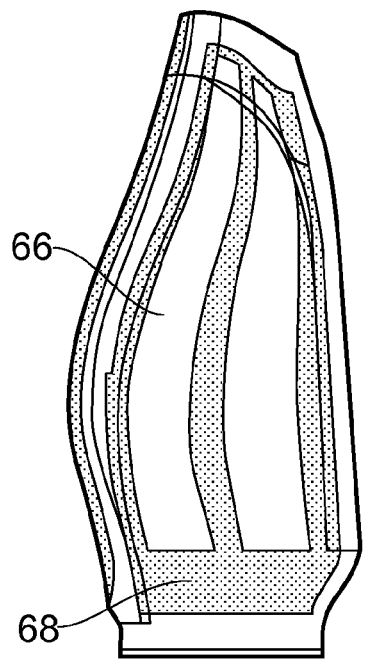
Figure 7:
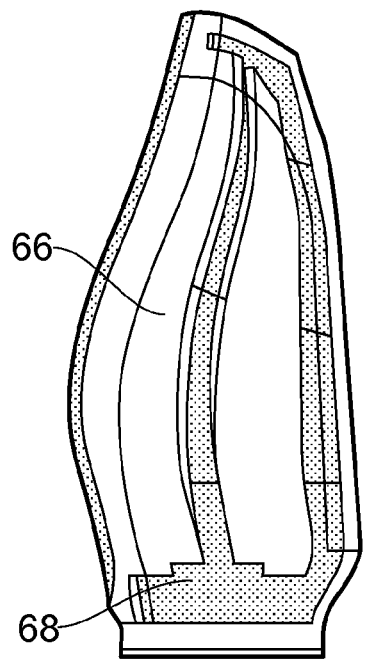
Figure 8:
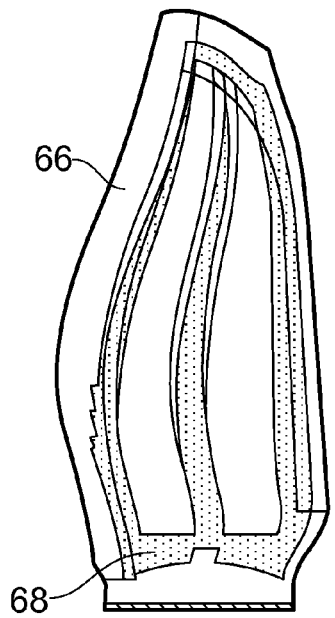
Figure 9:
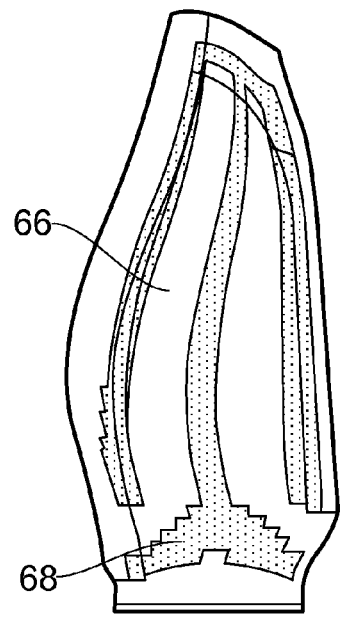
Figure 10:
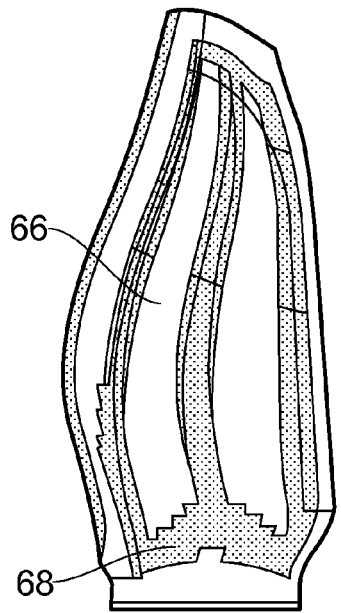
Figure 11:
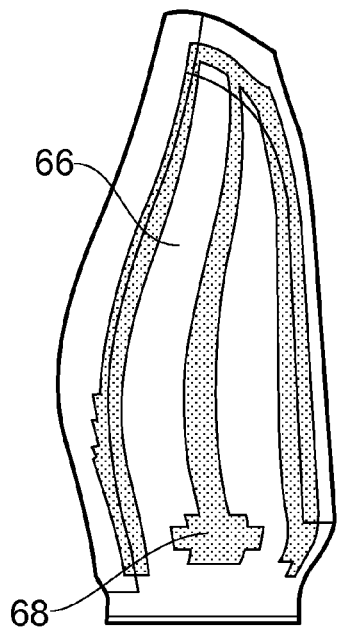
Figure 12:
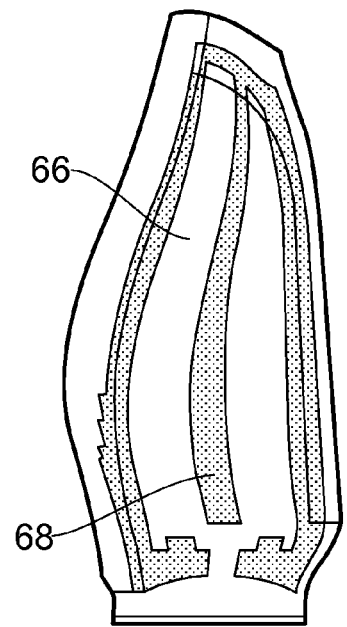
Figure 13:
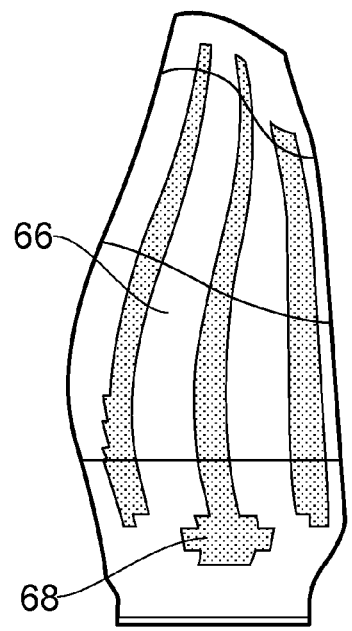

The z-pins 60 are arranged so as to define a deflector region 64, indicated by a dotted line, and a delamination region 66. In the present embodiment the deflector region 64 is shown as being defined by z-pins provided in a plurality of groups 62, but in alternative embodiments there may be no discernable groups within portions of the deflector region, see for example the embodiment shown in FIG. 4.

The z-pins in the deflector region 64 are arranged to increase the delamination strength, i.e. increase the strain energy release rate ($G_{IC}$) in the deflector region. The delamination region is free from z-pins, such that the delamination region has a strain energy release rate less than the deflector region. For example, the $G_{IC}$ of the deflector region may be at least twice that of the delamination region. In exemplary embodiments, the average strain energy release rate of the deflector region is equal to or greater than 2000 J/m² and the average strain energy of the delamination region is equal to or less than 600 J/m². For example, the average strain energy release rate of the deflector region may be equal to or greater than 4000 J/m², e.g. 5000 J/m².

A plurality of z-pins are provided in the deflector region 64 in both a spanwise S and chordwise C direction. As such, the width of the deflector region is several times greater than the diameter of a z-pin.

The arrangement of the deflector region 64 and the delamination region 66 is such that the deflector region deflects delamination to the delamination region where the delamination is permitted to propagate. This is different to the arrangements of the prior art which arrange the z-pins so as to prevent delamination throughout the entirety of the blade. It has been found that guiding and allowing delamination, instead of preventing delamination of the blade, can reduce the weight of the blade.

The deflector region 64 and the delamination region 66 are selected such that the natural frequency of the blade is substantially unchanged after impact by a foreign body or by another fan blade (in the failure event of a fan blade being released).

Modelling techniques known in the art can be used to identify the deflector region shape and size required. However, the following are guidelines as to suitable arrangements, which can be modified for a specific blade size and shape.

Referring still to FIG. 3, the deflector region 64 includes a number of deflector portions 68a, 68b, 68c, 68d and 68e. The deflector region may include at least one but typically three deflector portions in the spanwise direction (referred to from hereon in as spanwise deflector portions 68a, 68b, 68c) and the deflector region may include at least one but typically two defector portions in the chordwise direction (referred to from hereon in as chordwise deflector portions 68d, 68e). In FIG. 3 the deflector portions 68a, 68b, 68c each meet (or join) deflector portions 68d and 68e, that is the deflector portions form a continual deflector region. However, in alternative embodiments the deflector portions may be discrete, that is one or more of the deflector portions may not meet or join each other.

The foremost spanwise deflector portion 68a and rearmost spanwise deflector portion 68c may be greater than or equal to 30 mm wide in the chordwise direction, and may typically be equal to 30 mm. The middle spanwise deflector portion 68b may be greater than or equal to 30 mm wide in the spanwise direction, and may typically be 60 mm. The central spanwise deflector portion 68c may be provided along the blades mid-chord line. The foremost and rearmost deflector portions may be provided at a position at least the width of said spanwise deflector portions from the respective edges of the fan blade, for example at a distance greater than or equal to 30 mm.

The lower chordwise deflector portion 68e may be between 60 and 300 mm wide in the spanwise direction, and may typically be 120 mm. The upper chordwise deflector portion 68d may be between 30 and 180 mm in the spanwise direction and may typically be 60 mm. The lower chordwise deflector portion may be at any height up the blade (in the spanwise direction towards the tip of the blade), but typically no higher than the half height of the blade. The upper chordwise deflector portion may be provided at a distance greater than or equal to 30 mm from the tip of the blade and at least above the half height of the blade in the spanwise direction, for example, the upper chordwise deflector portion may typically be its own width away from the tip of the blade in the spanwise direction towards the root of the blade.

Various alternative arrangements of the spanwise and chordwise deflector regions are shown in FIGS. 4 to 18. FIGS. 4 to 18 illustrate that the spanwise and chordwise deflector regions can be of varying dimensions, shape and position. In addition, as mentioned previously, the Figures show deflector portions defining a continuous deflector region, and one or more deflector portions defining discrete portions of the deflector region. The delamination region is labelled 66 and the deflector regions are labelled 68, not all of the deflector regions are labelled, but the shading of the deflector regions is consistent for each figure so that the deflector regions are easily identified.

Figure 19:
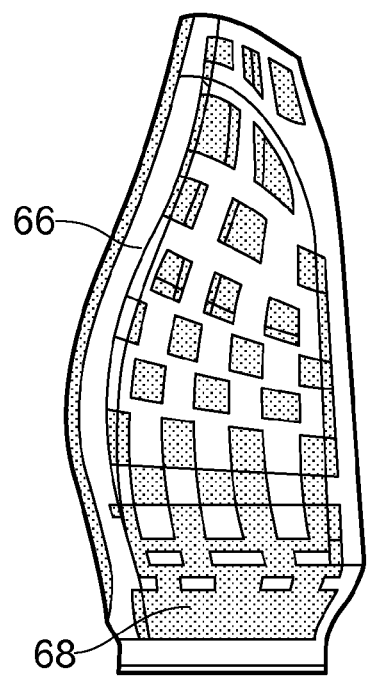
Figure 20:
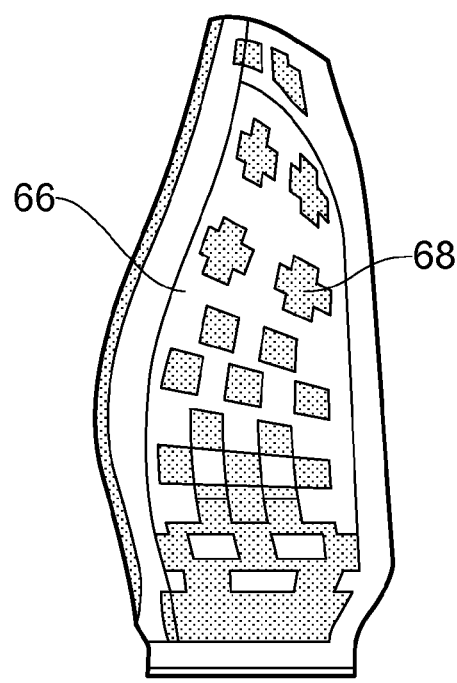

In further alternative embodiments, the deflector region may include a plurality of discrete deflector portions that are not elongate in shape, as previously shown. For example the deflector region may include a plurality of substantially square or rectangular deflector portions 68 as shown in FIG. 19, and/or may include a plurality of cross-shaped deflector portions 68 as shown in FIG. 20. The deflector portions may be aligned with the spanwise direction, and/or the deflector portions may be angled to the spanwise direction. The size of the deflector portions varies across the blade. In both the embodiments shown in FIGS. 19 and 20, the spacing of the deflector portions is denser towards the root of the blade than towards the tip. This is to increase resistance to delamination at the root. The deflector portions may be considered as being baffles.

Figure 14:
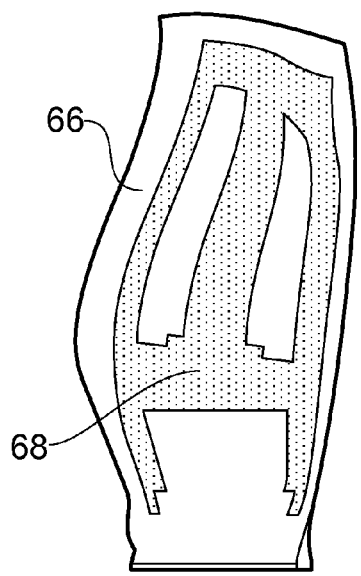
Figure 15:
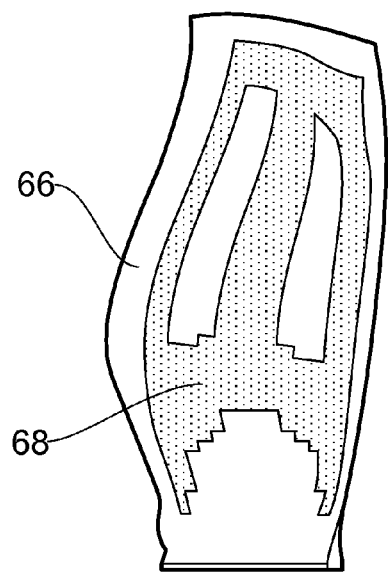
Figure 16:
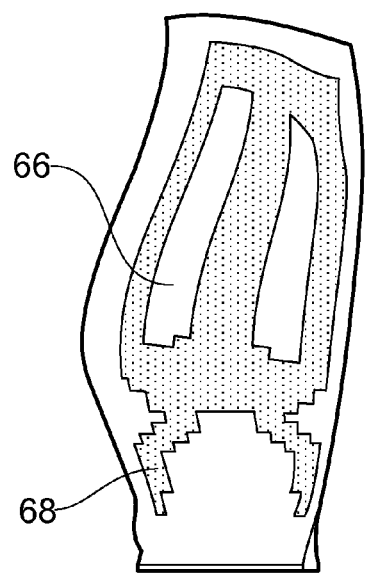
Figure 17:
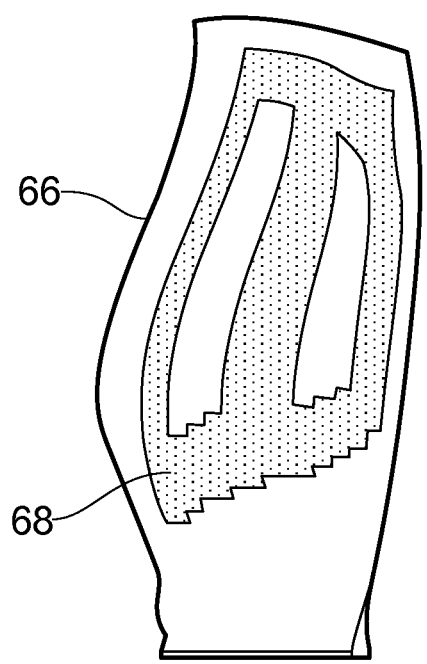
Figure 18:
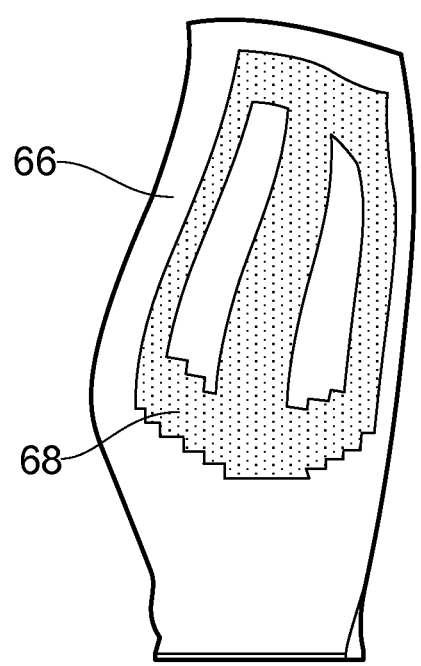
Figures 21, 22:
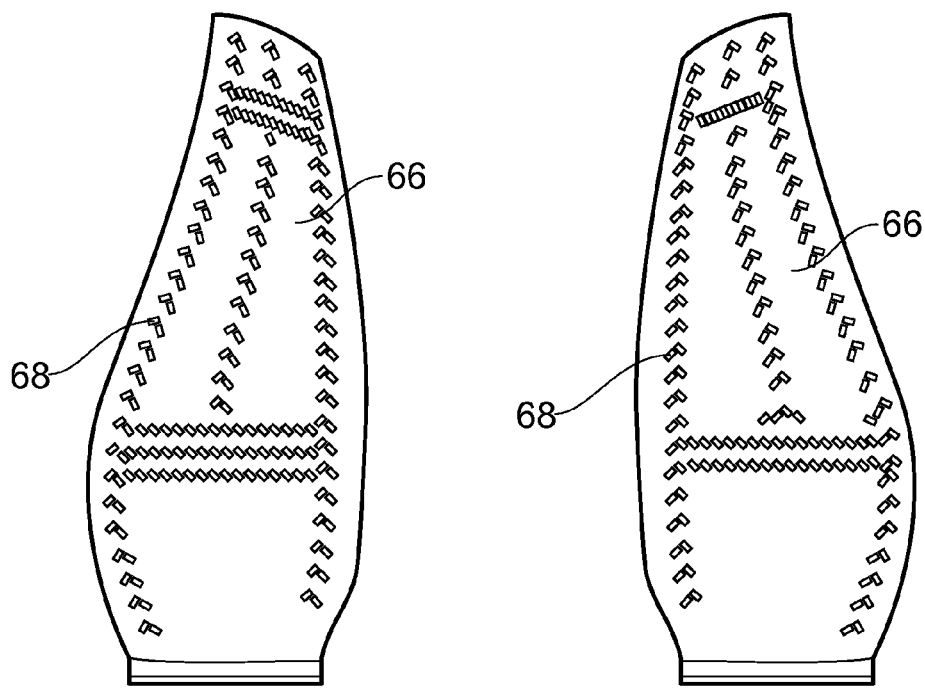
Figure 23:
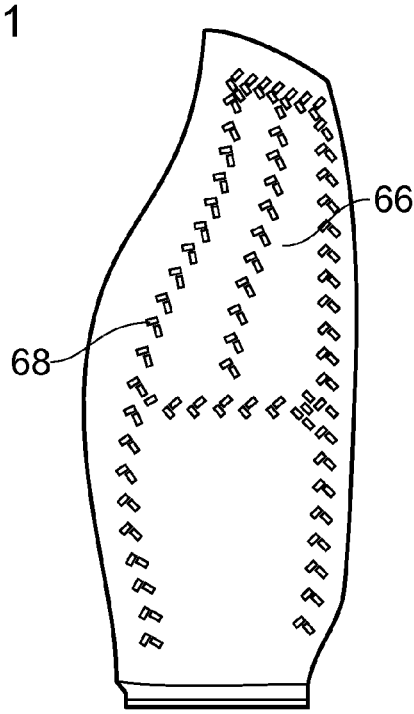

Further alternative arrangements are shown in FIGS. 21 to 23, these alternative arrangements are similar to those shown in FIG. 14. As illustrated in FIG. 21 and FIG. 22, the pins may be inserted from both the suction side and pressure side of the blade. The pattern of pins may be similar on the suction side as on the pressure side, but there may be a variation in pattern. For example, the thickness of the deflector portion may be different and/or the position may be out of phase, in this way the pins are not inserted in the same position on the suction side as on the pressure side of the blade. It can also be seen in FIGS. 21 and 22, that the chordwise deflector strip may be spaced from the tip of the blade.

Once the desired configuration of z-pins is known, the fan blade 40 can be manufactured. To manufacture the fan blade 40, the body of the blade is made using a laminate construction. There are various methods of forming a laminate construction, one example method is to lay pre-impregnated tape using an automated fibre placement machine, a further example method is dry fibre preforming. Once the general shape of the blade is formed, z-pins are inserted through the thickness of the uncured blade 40. The z-pins may be inserted using an ultrasonic horn; that is the z-pins are arranged in a polymer foam carrier (e.g. one group 62 may be formed by one polymer foam carrier assembly) and the ultrasonic horn is used to drive the z-pins into the composite laminate, as is well understood in the art. Alternatively, the z-pins may be inserted using an alternative method such as that described in US2013/089702A1 and incorporated herein by reference. The blade 40 is then cured. It will be appreciated by the person skilled in the art that this is just one method of manufacturing the blade 40 and other methods may be used, particularly as new manufacturing methods develop.

It will be appreciated by one skilled in the art that, where technical features have been described in association with one or more embodiments, this does not preclude the combination or replacement with features from other embodiments where this is appropriate. Furthermore, equivalent modifications and variations will be apparent to those skilled in the art from this disclosure. Accordingly, the exemplary embodiments of the invention set forth above are considered to be illustrative and not limiting.

For example, instead of using z-pins, the deflector region may be reinforced in any other suitable manner known in the art, for example using stitching, weaving, tufting, or zanchor reinforcement.

The invention claimed is:

1. A composite component having a body formed from a plurality of fibre reinforced non-metallic layers, the body comprising an aerofoil portion with:
   a delamination region configured so as to permit delamination; and
   a deflector region configured so as to resist delamination such that in the event of delamination, the delamination is deflected to and continues to propagate in the delamination region, the deflector region including a plurality of deflector portions such that at least one deflector portion extends substantially an entire length of the aerofoil portion.

2. The composite component according to claim 1, wherein an average strain energy release rate of the deflector region is at least twice that of the delamination region.

3. The composite component according to claim 2, wherein an average strain energy release rate of the deflector region is equal to or greater than 2000 J/m$^2$ and an average strain energy release rate of the delamination region is equal to or less than 600 J/m$^2$.

4. The composite component according to claim 1, wherein the deflector region has a minimum width greater than 2 mm.

5. The composite component according to claim 1, wherein the delamination region is free from reinforcement.

6. The composite component according to claim 1, wherein the deflector region is reinforced using z-pins, stitching, stapling, tufting or weaving.

7. The composite component according to claim 6, wherein the deflector region is reinforced using z-pins, and the deflector region has a pin areal density equal to or between 0.5% and 5%.

8. The composite component according to claim 1, wherein the composite component is a fan blade.

9. The composite component according to claim 8, wherein a width of the deflector region is at least one twentieth of a maximum width of the fan blade.

10. The composite component according to claim 8, wherein the deflector region covers 10 to 40% of an overall area of a pressure and/or suction face of the fan blade.

11. The composite component according to claim 8, wherein the deflector portions extend in a spanwise direction.

12. The composite component according to claim 11, wherein the deflector portions are spaced from a leading edge or a trailing edge of the fan blade by a distance greater than or equal to a chordwise width of each deflector portion.

13. The composite component according to claim 8, wherein the plurality of deflector portions includes three elongate deflector portions extending generally in a spanwise direction, and wherein one of the elongate deflector portions is provided proximal to a leading edge of the fan blade, one is provided proximal to a trailing edge of the fan blade, and one is provided mid-way between the leading edge and the trailing edge.

14. The composite component according to claim 13, wherein the mid-way elongate deflector portion has a greater chordwise width than the leading deflector portion and the trailing edge deflector portion.

15. The composite component according to claim 13, wherein the mid-way deflector portion is coincident with a mid-chord line of the fan blade.

16. The composite component according to claim 8, wherein the deflector portions extend in a chordwise direction.

17. The composite component according to claim 16, wherein at least one deflector portion that extends in the chordwise direction is provided proximal to a root of the fan blade.

18. The composite component according to claim 16, wherein at least one deflector portion that extends in the chordwise direction is provided proximal to a tip of the fan blade.

* * * * *